(12) United States Patent
Weon

(10) Patent No.: US 6,272,138 B1
(45) Date of Patent: Aug. 7, 2001

(54) METHOD AND APPARATUS FOR REDUCING JITTER OR WANDER ON INTERNETWORKING BETWEEN ATM NETWORK AND PDH NETWORK

(75) Inventor: Chan-Yeon Weon, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/110,839

(22) Filed: Jul. 7, 1998

(30) Foreign Application Priority Data

Jul. 7, 1997 (KR) .................................... 97-31274

(51) Int. Cl.[7] ............................. H04L 12/56; H04J 3/24
(52) U.S. Cl. ..................... 370/395; 370/474; 370/516; 375/226; 375/371; 348/497
(58) Field of Search ...................... 370/395, 466, 370/471, 474, 516; 375/226, 240.28, 371–372, 240.29; 348/466–467, 464, 497

(56) References Cited

U.S. PATENT DOCUMENTS

| 5,274,680 | 12/1993 | Sorton et al. | 375/371 |
|---|---|---|---|
| 5,287,347 | 2/1994 | Spanke | 370/235 |
| 5,446,734 | 8/1995 | Goldstein | 370/397 |
| 5,471,510 | 11/1995 | Renault et al. | 375/372 |
| 5,534,937 | 7/1996 | Zhu et al. | 370/506 |
| 5,563,884 | 10/1996 | Fimoff et al. | 370/391 |
| 5,577,039 | 11/1996 | Won et al. | 370/466 |
| 5,640,388 | 6/1997 | Woodhead et al. | 370/468 |
| 5,742,765 * | 4/1998 | Wong et al. | 370/465 |
| 5,751,709 * | 5/1998 | Rathnavelu | 370/395 |
| 5,822,321 * | 10/1998 | Petersen et al. | 370/474 |
| 5,828,414 * | 10/1998 | Perkins et al. | 375/240.29 |

\* cited by examiner

Primary Examiner—Wellington Chin
Assistant Examiner—Maikhanh Tran
(74) Attorney, Agent, or Firm—Robert E. Bushnell, Esq.

(57) ABSTRACT

A method and apparatus for reducing jitter and wander on the internetworking between ATM network and PDH network is disclosed. The apparatus comprises a timing recovery block which receives a system clock of ATM network and divides the system clock and provides a reference clock and a first transmission clock in order to recover a synchronized clock in PDH network by using a synchronized clock information of a PDH user in an ATM cell stream transmitted from the ATM network; a clock smoother which receives the first transmission clock and reduces jitter or wander and outputs a second transmission clock; an AAL1-SAR device which segments ATM cells of ATM network into PDH data stream and transmits the same to PDH network or reassembles the PDH data stream transmitted from PDH network to ATM network into an ATM cell stream, and receives a reference clock from the timing recovery block and provides 4 bit SRTS (Synchronous Residual Timing Stamp) code related to synchronized clock information of PDH user to the timing recovery block and according to the first transmission clock outputs the PDH data stream including jitter and wander; a jitter absorber which receives the PDH data stream including jitter or wander, and reduces the jitter or wander generated in the AAL1-SAR and outputs PDH data stream according to the second transmission clock; and a framer which receives the second transmission clock and the PDH data stream in which jitter or wander is reduced, and segments PDH data stream transmitted from PDH network into each time slot or reassembles the time slots into PDH data stream.

9 Claims, 4 Drawing Sheets

METHOD AND APPARATUS FOR REDUCING JITTER OR WANDER ON INTERNETWORKING BETWEEN ATM NETWORK AND PDH NETWORK

CLAIM FOR PRIORITY

This application makes reference to, incorporates the same herein, and claims all benefits accruing under 35 U.S.C. §119 from an application for METHOD AND APPARATUS FOR REDUCING JITTER OR WANDER ON INTERNETWORKING BETWEEN ATM NETWORK AND PDH NETWORK earlier filed in the Korean Industrial Property Office on the $7^{th}$ of July 1997, and there duly assigned Ser. No. 31274/1997, a copy of which application is annexed hereto.

BACKGROUND OF THE INVENTION

1. Technical Field

The present invention relates to method and apparatus for reducing jitter or wander on internetworking between ATM network and PDH network, and more particularly relates to method and apparatus for reducing jitter or wander on internetworking between ATM network and PDH network interface by using a jitter absorber comprised of a First-In-First-Out (FIFO) buffer, and a clock smoother when recovering timing synchronization.

2. Related Art

Generally, ATM is a specific packet-oriented transfer mode using an asynchronous time division multiplexing technique where both line switching and packet switching are unified and many pieces of data information such as voice, video, and data are organized in fixed-sized packets, called cells each comprised of a data portion and a header portion for storing destination information needed to route the cell through the network at a constant bit rate. The operation of ATM networks is well known and so is the problem of jitter as disclosed, for example, in U.S. Pat. No. 5,287,347 for *Arrangement For Bounding Jitter In A Priority-Based Switching System* issued to Spanke, U.S. Pat. No. 5,274,680 for *Device For The Transmission Of Synchronous Information By An Asynchronous Network, Notably An ATM Network* issued to Sorton et al., U.S. Pat. No. 5,471,510 for *Asynchronous Transfer Mode Digital Telecommunication Network Terminal Equipment Synchronization Device* issued to Renault et al., U.S. Pat. No. 5,534,937 for *Minimum-Delay Jitter Smoothing Device And Method For Packet Video Communications* issued to Zhu et al., U.S. Pat. No. 5,563,884 for *Reducing Multiplex Jitter In An ATM/MPEG System* issued to Fimoff et al., and U.S. Pat. No. 5,640,388 for *Method And Apparatus For Removing Jitter And Correcting Timestamps In A Packet Stream* issued to Woodhead et al.

ATM network may be crossed connected with a plesiochronous digital hierarchy (PDH) network in the manner disclosed, for example, in U.S. Pat. No. 5,577,039 for *System And Method Of Signal Transmission Within A Plesiochronous Digital Hierarchy unit Using ATM Adaptation Layers* issued to Won et al., and assigned to the assignee of the instant application. A cross connection system for ATM and PDH data comprises a line interface unit, a multiplexer/demultiplexer, a plurality of ATM adaptation layer modules, a first stage cell multiplexer/demultiplexer, a second stage cell multiplexer/demultiplexer and a router. The ATM adaptation layer AAL1 performs a segmentation and reassembly (SAR) function. At the transmission side, the ATM adaptation layer AAL1 receives PDH digital signal level 3 (DS3) data and demultiplexes the same into 28 digital signal level 1 (DS1) data. ATM adaptation layer modules convert the 28 DS1 data to ATM cell streams. The ATM cell streams are multiplexed into a single ATM MUX cell stream and then multiplexed with another cell stream. A router receives the combined multiplexed cell stream adds a header field, and outputs an ATM cell. At the receiving side, the ATM cell data is converted back to DS3 PDH data using the same system components.

AAL1-SAR device is used to convert synchronous information of a PDH user into 4 bit synchronous information of an ATM cell stream for transmission via a network link. At the receiving side, the AAL1-SAR device extracts synchronous information for a PDH data stream in ATM cell streams and transmits the same to a timing recovery block for a transmission clock recovery. The timing recovery block recovers a transmission clock according to the DS1 (1.544 Mbps) and E1 (2.048 Mbps) line speed that includes delay jitter or wander. The jitter or wander represents a phase variation of a signal by noise and interference of a communication line, a variation of a circumference temperature or bit stuffing, etc. When the phase variation of a signal varies rapidly, jitter is generated. Likewise when the phase variation of a signal varies slowly, wander is generated. The jitter or wander can cause the loss of transmission data when reading data transmitted from a buffer or can cause a slip phenomenon wherein unreliable data is inserted among transmission data. However, in case that the timing recovery block generates a transmission clock having DS1 or E1 line speed, and the transmission clock includes a jitter or wander, such a jitter or wander can cause data error or false operation of overall network synchronization.

SUMMARY OF THE INVENTION

Accordingly, it is therefore an object of the present invention to provide a method for reducing jitter and wander on internetworking between ATM network and PDH network.

It is an another object of the present invention to provide an apparatus for reducing jitter and wander on internetworking between ATM network and PDH network using a jitter absorber comprised of a First-In-First-Out (FIFO) buffer, and a clock smoother when recovering timing synchronization.

These and other objects of the present invention can be achieved by an apparatus for reducing jitter and wander on internetworking between an ATM network and a PDH network. The apparatus includes a timing recovery unit which receives a system clock of the ATM network and divides the system clock to produce a reference clock and a first transmission clock related to the PDH network in order to recover a synchronized clock in the PDH network by using synchronized clock information of a PDH user in an ATM cell stream transmitted from the ATM network; a clock smoother which reduces jitter or wander contained in said first transmission clock and generates a second transmission clock; a segmentation and reassembly device which segments the ATM cell stream transmitted from the ATM network into a PDH data stream and transmits the PDH data stream to the PDH network, or reassembles the PDH data stream transmitted from the PDH network to an ATM cell stream, and receives the reference clock from the timing recovery unit and provides synchronous residual timing stamp codes related to synchronized clock information of the PDH user to the timing recovery unit and outputs the PDH data stream including jitter and wander according to said first transmission clock; a jitter absorber which receives the PDH data stream including jitter or wander, and reduces the jitter or wander generated in the segmentation and reassembly device and outputs the PDH data stream according to the second transmission clock a framer which receives the second transmission clock and the PDH data stream in which jitter or wander is reduced, and segments the PDH data stream transmitted from the PDH network into each time slot or reassembles the time slots into the PDH data stream.

In accordance with another aspect of the present invention, a method for reducing jitter and wander on internetworking between an asynchronous transfer mode (ATM) network and a plesiochronous digital hierarchy (PDH) network, comprising the steps of: (a) receiving a system clock of the ATM network and providing a reference clock and a first transmission clock in order to recover a synchronized clock in the PDH network by using a synchronized clock information of a PDH user in an ATM cell stream transmitted from the ATM network; (b) receiving the first transmission clock to reduce jitter or wander contained therein and generating a second transmission clock; (c) segmenting the ATM cell stream transmitted from the ATM network into a PDH data stream and transmitting the segmented PDH data stream to the PDH network, or reassembling the PDH data stream transmitted from the PDH network into the ATM cell stream and transmitting the reassembled ATM cell stream to the ATM network, and providing synchronous residual timing stamp codes and generating the PDH data stream including jitter or wander according to the first transmission clock; (d) receiving the PDH data stream including jitter or wander, and reducing the jitter or wander included in the PDH data stream and outputting the PDH data stream according to the second transmission clock; (e) receiving the second transmission clock and the PDH data stream in which jitter or wander is reduced, and segmenting the PDH data stream transmitted from the PDH network into each time slot or reassembling the time slots into the PDH data stream.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
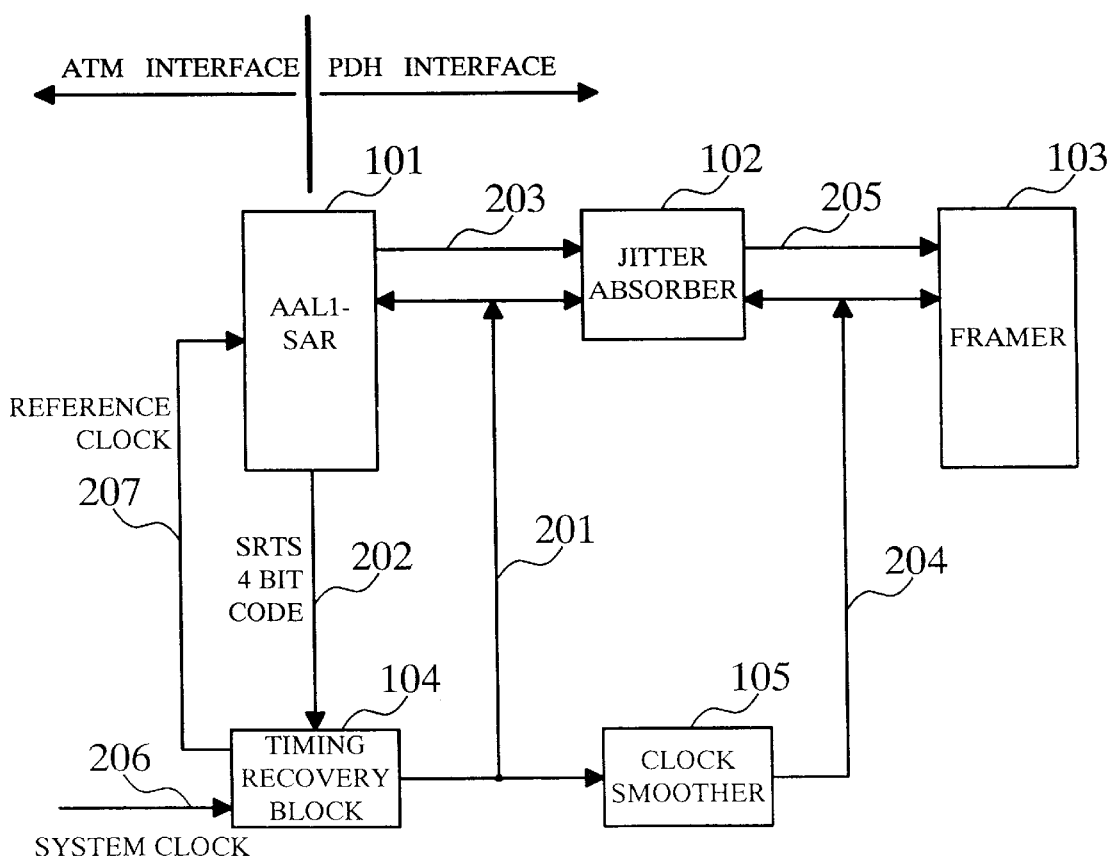
FIG. 1 illustrates a block diagram of an apparatus for reducing delay jitter or wander on internetworking between ATM network and PDH network according to a preferred embodiment of the present invention.

Referring now to the drawings and particularly to FIG. 1, which illustrates an apparatus for reducing jitter and wander on internetworking between an ATM network and a PDH network according to a preferred embodiment of the present invention. Referring to FIG. 1, the apparatus includes an ATM adaptation layer 1—Segmentation And Reassembly AAL1-SAR device 101, a jitter absorber 102, a framer 103, a timing recovery block 104 and a clock smoother 105. A system clock 206 which is synchronized with the ATM network is input into a timing recovery block 104 which converts a 4 bit SRTS code (Synchronous Residual Timing Stamp) 202 input from the AAL1-SAR device 101 related clock information into a first transmission clock 201 by using the system clock 206.

Simultaneously, the AAL1-SAR device 101 generates the 4 bit SRTS code from ATM cell streams with reference to 2.43 MHz reference clock 207 synchronized with the system clock 206. The 4 bit SRTS code 202 transmitted from the transmitting side or regenerated at the transmitting side includes jitter or wander because of clock information about 3008 bit of PDH data streams which can be then reduced by a jitter absorber 102 and a clock smoother 105 according to the principles of the present invention. The jitter absorber 102 consists of a FIFO (First In First Output) buffer of which a capacity can be changed by interfaced transmission bandwidth.

A first transmission clock 201 generated from the timing recovery block 104 is sent to the AAL1-SAR device 101 and the jitter absorber 102, and then PDH data streams generated from the AAL1-SAR device 101 is sent into the jitter absorber 102 by the first transmission clock 201 related the PDH network. The first transmission clock 201 is input to the clock smoother 105 which provides a second transmission clock 204 into the jitter absorber 102 and the clock smoother 105. Simultaneously, PDH data stream is stored in the jitter absorber 102 and the PDH data stream includes jitter or wander and the absorber 102 reduces jitter or wander, and then transmits the PDH data streams into the framer 103.

Figure 2:
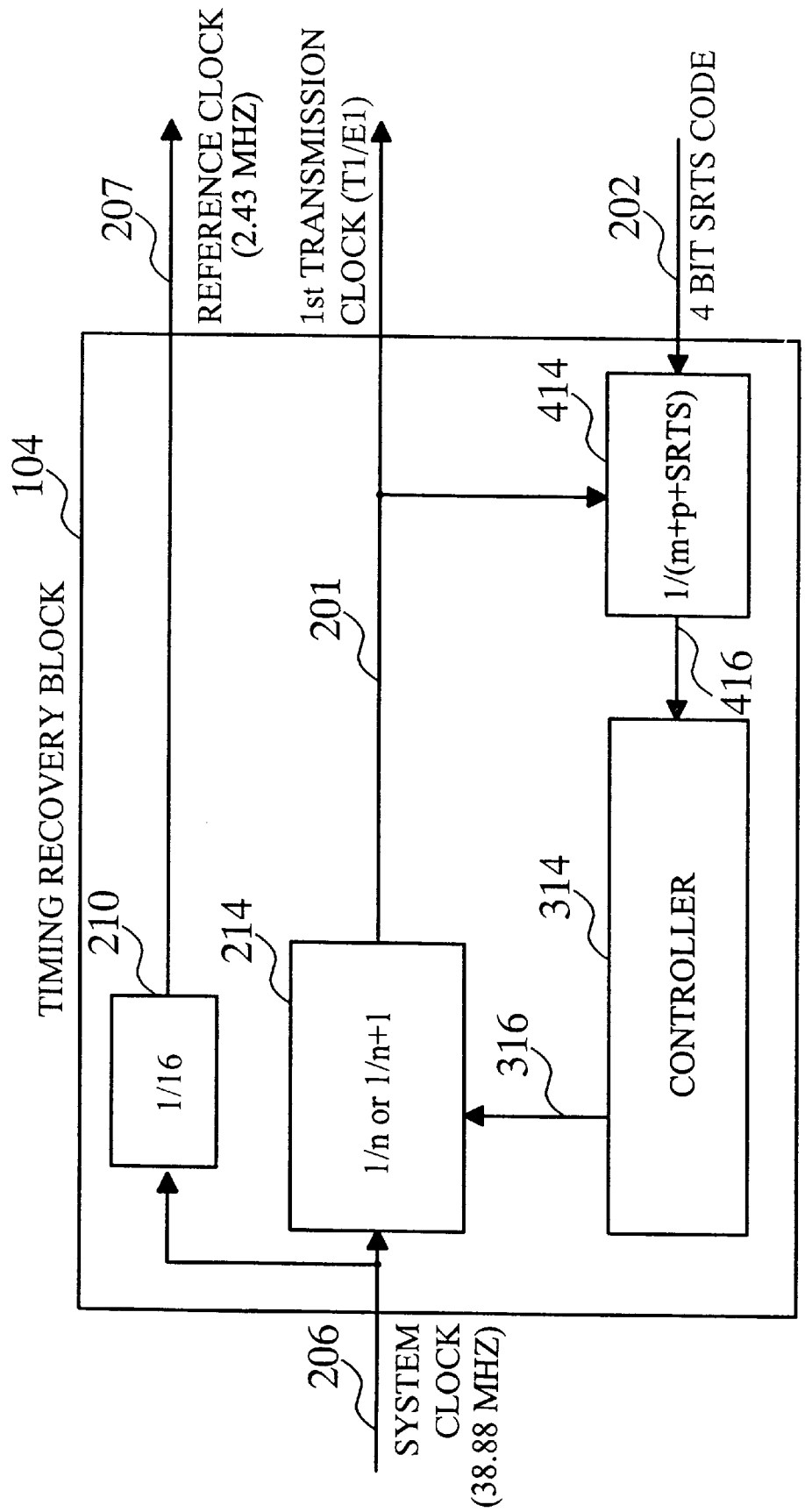
FIG. 2 illustrates a block diagram of a timing recovery block which is synchronized with the system clock of ATM network.

FIG. 2 illustrates a timing recovery block 104 synchronized with the system clock of ATM network. The timing recovery block 104 generates a first transmission clock 201 related a PDH network after receiving the system clock 206 of an ATM network and the 4 bit SRTS code 202 related clock information of a PDH user. As shown in FIG. 2, the timing recovery block 104 comprises a first divider 210 which is a 1/16 divider, a second divider 214 which is either a 1/n or 1/(n+1) divider, a third divider 414 which is a 1/(m+p+SRTS) divider, and a divider controller 314. The "n" is an integer value indicating a clock dividing number; "m" and "p" are an integer value (n>1, p>1) indicating a dividing count; and "SRTS" is integer value between +7~−8 boundary which is displayed the 4 bit SRTS code.

First of all, the 38.88 MHz system clock 206 synchronized an ATM network is input to the 1/16 divider 210 which divides the input system clock 206 by 16 and transmits a 2.43 MHz reference clock 207 to the AAL1-SAR device 101. The timing recovery block 104 receives the 4 bit SRTS code 202 from the AAL1-SAR device 101 related the clock of the PDH user. The first transmission clock 201 which is related to the PDH network and is generated from the timing recovery block 104, is either a 1.544 MHz(T1) transmission clock or a 2.048 MHz(E1) transmission clock.

The 1/16 divider 210 receives the system clock 206 of approximately 38.88 MHz synchronized with the ATM network and divides the system clock 206 by sixteen (16) in order to generate a reference clock 207 of approximately 2.43 MHz to the AAL1-SAR device 101. The 1/n or 1/(n+1)

divider 214 receives the system clock 206 and according to the control of the divider controller 314 and divides the system clock 206 by n or n+1 in order to generate a first transmission clock 201 which is either a 1.544 MHz(T1) transmission clock or a 2.048 MHz(E1) transmission clock. The first transmission clock 201 is input to the 1/(m+p+ SRTS) divider 414 which divides the first transmission clock 201 by (m+p+SRTS) and sends a first clock divider signal 416 to the divider controller 314 for controlling operation of the divider controller 314. The clock divider signal 416 is input to the divider controller 314 which controls the n divider (m+SRTS) times or the (n+1) divider p times and outputs a second clock divider control signal 316 to the 1/n divider or the 1/(n+1) divider 214. On the other hand, the first transmission clock 201 is input to the AAL1-SAR device 101 which provides into the jitter absorber 102 the PDH data streams including jitter and wander.

Figure 3:
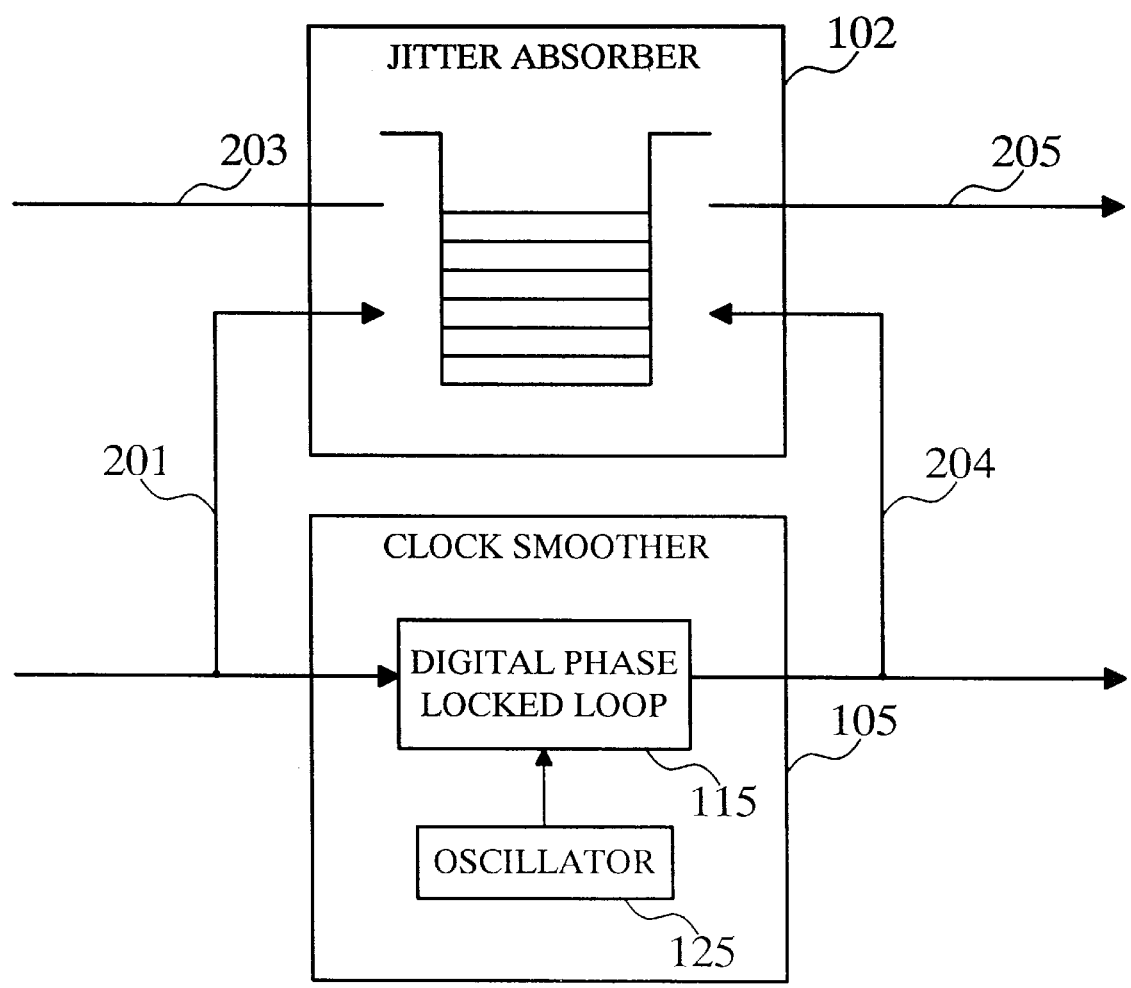
FIG. 3 illustrates a block diagram of a clock smoother and a jitter absorber shown in FIG. 1.

As shown in FIG. 3, the first transmission clock 201 is passed to a digital phase locked loop (DPLL) which provides a transmission clock 204 with reduced jitter or wander to the jitter absorber 102. The jitter absorber 102 then provides the transmission data 204 to the framer 103.

Figure 4:
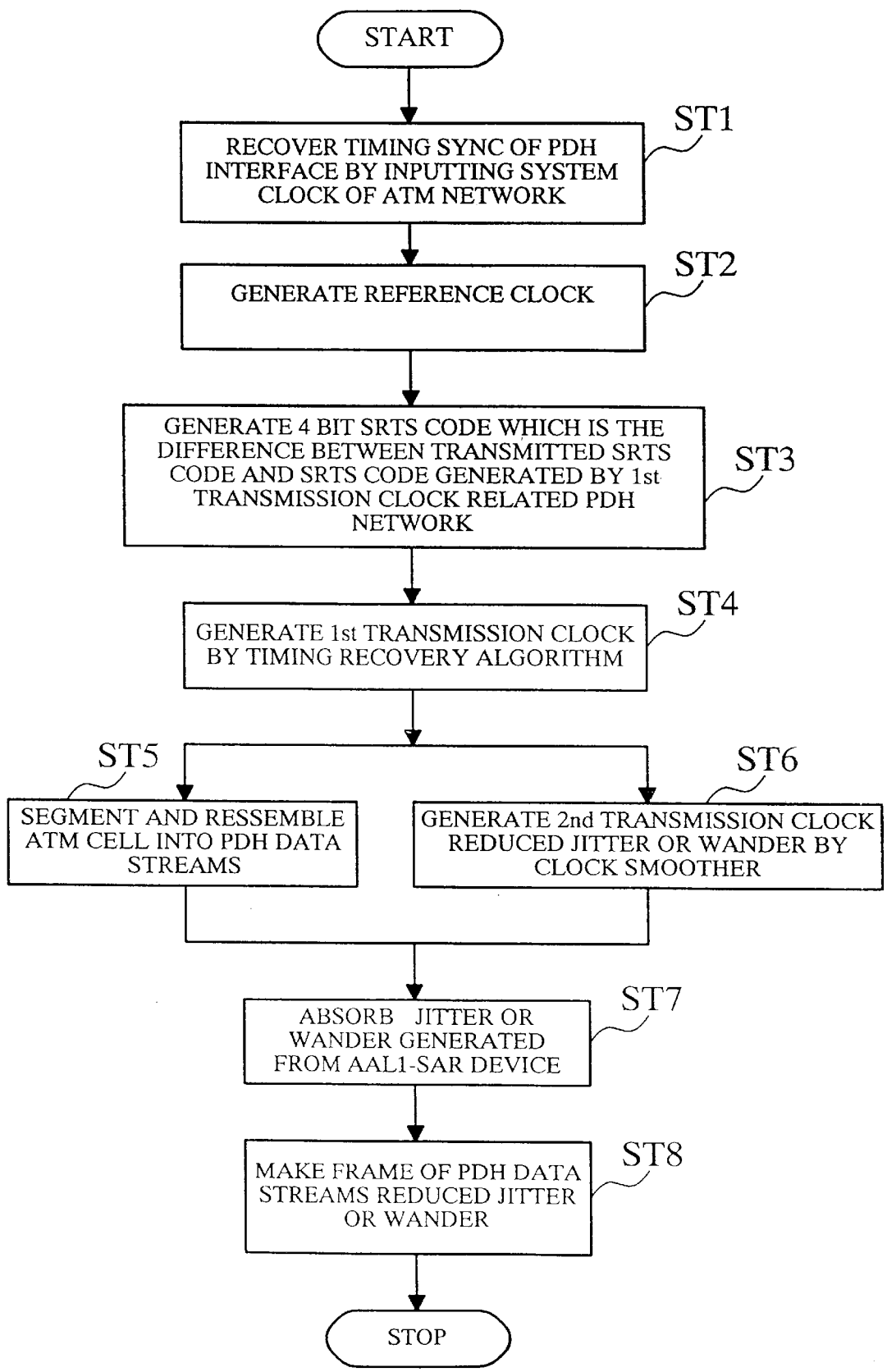
FIG. 4 illustrates a flowchart of a method for reducing delay jitter or wander on internetworking between ATM network and PDH network according to the preferred embodiment of the present invention.

FIG. 4 illustrates a flowchart of method for reducing jitter or wander on internetworking between an ATM network and a PDH network according to the principles of the present invention. The 38.88 MHz system clock 206 is input to the time recovery block 104 for synchronization recovery of the PDH network which is synchronized with ATM network at step 1 (ST1). The time recovery block 104 divides the system clock 206 by 16 and generates a reference clock 207 of approximately 2.43 MHZ and transmits the same to the AAL1-SAR device 101 at step 2 (ST2).

The AAL1-SAR device 101 generates a 4 bit SRTS (Synchronous Residual Timing Stamp) code 202 at ATM cell streams on the basis of the 2.43 MHZ reference clock 207 which is synchronized with the system clock 206. The AAL1-SAR device 101 also compares the generated 4 bit SRTS with the SRTS code transmitted through ATM cell and provides the difference to the time recovery block 104 at step 4 (ST3). The 4 bit SRTS code 202 of difference component is input to the timing recovery block 104 which generates the transmission clock 201 by using SRTS algorithm at step 4 (ST4). The transmission clock 201 is input to the AAL1-SAR device 101 which segments and reassembles ATM cells into PDH data streams and receives the transmission clock 201 and provides the PDH data streams including jitter or wander to the jitter absorber 102 at step 5 (ST5). The transmission clock 201 is input to the clock smoother 105 which generates the transmission clock 204 with reduced jitter or wander at step 6 (ST6). The transmission clock 204 is input to the jitter absorber 102 which absorbs jitter or wander and provides PDH data streams with reduced jitter and wander to the framer 103 at step 7 (ST7). The framer 103 reduces jitter or wander from frames of PDH data streams at step 8 (ST8).

As described above, an apparatus for reducing jitter and wander on internetworking between an ATM network and a PDH network according to the present invention can reduce jitter or wander generated from a synchronous signal by using SRTS algorithm and by using the clock smoother 105 and the jitter absorber 102 in order to reduce jitter or wander of PDH data streams in transmission of data from the ATM network to the PDH network. The timing recovery block 104 of an apparatus for reducing jitter and wander on the internetworking between an ATM network and a PDH network according to the present invention can recover a clock with reduced jitter or wander with simple hardware implementation and can transmit and receive data by using stable clock.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. An apparatus for reducing jitter and wander on internetworking between an asynchronous transfer mode (ATM) network and a plesiochronous digital hierarchy (PDH) network, comprising:

a timing recovery unit which receives a system clock of the ATM network and divides the system clock to produce a reference clock and a first transmission clock related to the PDH network in order to recover a synchronized clock in the PDH network by using synchronized clock information of a PDH user in an ATM cell stream transmitted from the ATM network;

a clock smoother which reduces jitter or wander contained in said first transmission clock and generates a second transmission clock;

a segmentation and reassembly device which segments the ATM cell stream transmitted from the ATM network into a PDH data stream and transmits the PDH data stream to the PDH network, or reassembles the PDH data stream transmitted from the PDH network to an ATM cell stream, and receives the reference clock from said timing recovery unit and provides synchronous residual timing stamp codes related to synchronized clock information of the PDH user to said timing recovery block and outputs the PDH data stream containing jitter according to said first transmission clock;

a jitter absorber which receives the PDH data stream containing jitter, and reduces the jitter generated in said segmentation and reassembly device and outputs the PDH data stream according to said second transmission clock;

a framer which receives said second transmission clock and the PDH data stream in which jitter or wander is reduced, and segments the PDH data stream transmitted from the PDH network into each time slot or reassembles the time slots into the PDH data stream.

2. The apparatus of claim 1, wherein said timing recovery block comprises:

a first divider which receives said system clock from the ATM network and generates said reference clock by dividing said system clock by sixteen;

a second divider which receives the system clock from the ATM network and generates said first transmission clock by dividing said system clock by either n or (n+1);

a third divider which receives said first transmission clock and said synchronous residual timing stamp codes and generates a first clock control signal by dividing said first transmission clock by (m+p+SRTS); and a divider controller which receives said first clock control signal and generates a second clock control signal to control the division of said system clock.

3. The apparatus of claim 1, wherein said jitter absorber corresponds to a First-In-First-Out (FIFO) buffer having different capacity pursuant to interface bandwidth in order to reduce delay jitter contained in data generated from said segmentation and reassembly device.

4. The apparatus of claim 1, wherein said clock smoother comprises:
   an oscillator for generating a constant oscillating signal periodically; and
   a digital phase locked loop which receives said first transmission clock and said constant oscillating signal and smooths out said first transmission clock to generate said second transmission clock.

5. The apparatus of claim 2, wherein said first transmission clock output from said second divider of said timing recovery block is either a 1.544 MHz(T1) transmission clock or a 2.048 MHZ(E1) transmission clock and "n" represents an integer denoting a clock division number, m and p represent integers denoting division time(m>1, p>p1) and said SRTS denotes an integer between +7 and −8.

6. A method for reducing jitter and wander on internetworking between an asynchronous transfer mode (ATM) network and a plesiochronous digital hierarchy (PDH) network, comprising the steps of:
   (a) receiving a system clock of the ATM network and providing a reference clock and a first transmission clock in order to recover a synchronized clock in the PDH network by using a synchronized clock information of a PDH user in an ATM cell stream transmitted from the ATM network;
   (b) receiving said first transmission clock to reduce jitter contained therein and generating a second transmission clock;
   (c) segmenting the ATM cell stream transmitted from the ATM network into a PDH data stream and transmitting the segmented PDH data stream to the PDH network, or reassembling the PDH data stream transmitted from the PDH network into the ATM cell stream and transmitting the reassembled ATM cell stream to the ATM network, and providing synchronous residual timing stamp codes and generating the PDH data stream containing jitter according to said first transmission clock;
   (d) receiving the PDH data stream containing jitter, and reducing the jitter contained in the PDH data stream and outputting the PDH data stream according to said second transmission clock;
   (e) receiving said second transmission clock and the PDH data stream in which the jitter is reduced, and segmenting the PDH data stream transmitted from the PDH network into each time slot or reassembling the time slots into the PDH data stream.

7. The method of claim 6, wherein said step (a) comprises the steps of:
   receiving said system clock from the ATM network and generating said reference clock by dividing said system clock by sixteen;
   receiving said system clock and generating said first transmission clock by dividing said system clock by either n or (n+1);
   receiving said first transmission clock and said synchronous residual timing stamp codes and generating a first clock control signal by dividing said first transmission clock by (m+p+SRTS); and
   receiving said first clock control signal and generating a second clock control signal to control the division of said system clock by either n or (n+1).

8. The method of claim 6, wherein said step (d) comprises the steps of:
   generating a constant oscillating signal periodically; and
   receiving said first transmission clock and said constant oscillating signal and smoothing out said first transmission clock to generate said second transmission clock.

9. The method of claim 7, wherein said first transmission clock output from said second divider corresponds to either a 1.544 MHz(T1) transmission clock or a 2.048 MHz(E1) transmission clock and "n" represents an integer denoting a clock division number, m and p represent integers denoting division time(m>1, p>1) and said SRTS denotes an integer between +7 and −8.

* * * * *